J. A. JOHNSON.
AGRICULTURAL MACHINE.
APPLICATION FILED JUNE 7, 1915.
1,176,564.
Patented Mar. 21, 1916.
2 SHEETS—SHEET 2.
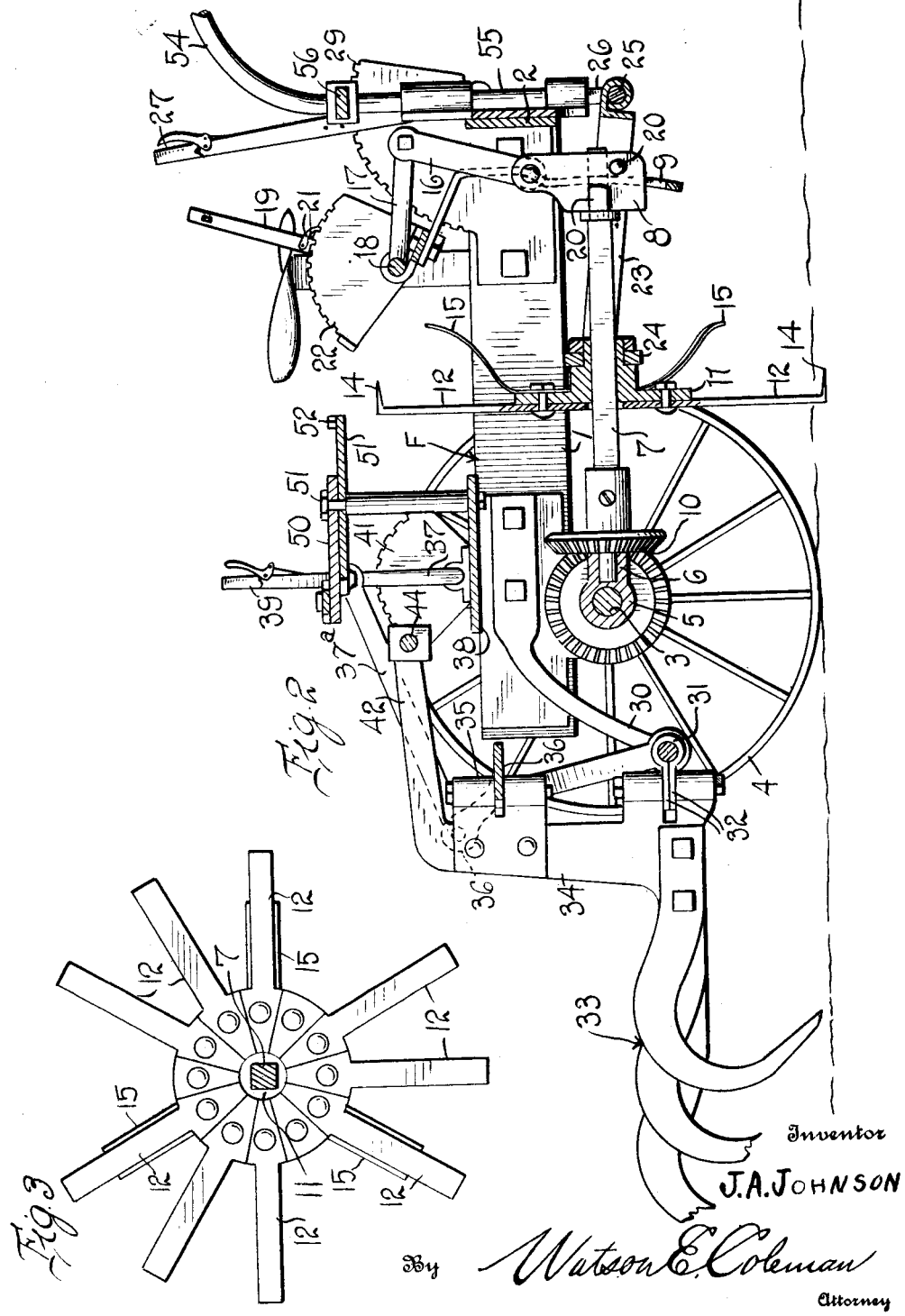
Inventor
J. A. JOHNSON
By Watson E. Coleman
Attorney

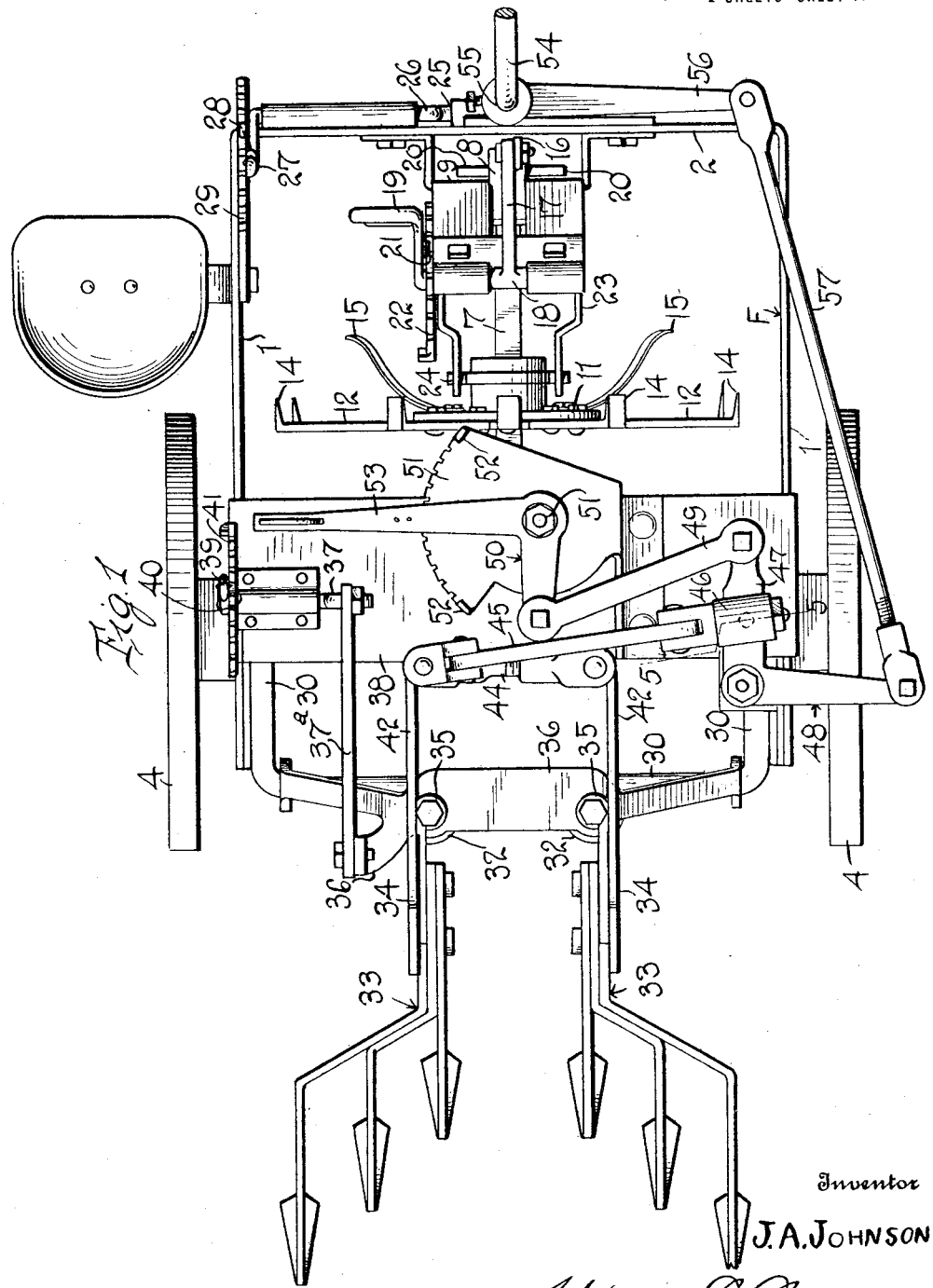

UNITED STATES PATENT OFFICE.

JOHN A. JOHNSON, OF SHERIDAN, WYOMING.

AGRICULTURAL MACHINE.

1,176,564.

Specification of Letters Patent.   Patented Mar. 21, 1916.

Application filed June 7, 1915. Serial No. 32,715.

*To all whom it may concern:*

Be it known that I, JOHN A. JOHNSON, a citizen of the United States, residing at Sheridan, in the county of Sheridan and State of Wyoming, have invented certain new and useful Improvements in Agricultural Machines, of which the following is a specification, reference being had to the accompanying drawings.

This invention relates to certain improvements in agricultural machines and has relation more particularly to a device of this general character especially designed and adapted for use as a weeder or the like; and it is an object of the invention to provide a novel and improved device of this general character including a rotary element provided with means whereby the operator may readily determine, during the advance of the machine, the plant to be left standing.

The invention consists in the details of construction and in the combination and arrangement of the several parts of my improved agricultural machine whereby certain important advantages are obtained and the device is rendered simpler, less expensive and otherwise more convenient and advantageous for use, all as will be hereinafter more fully set forth.

The novel features of the invention will be carefully defined in the appended claims.

In order that my invention may be the better understood, I will now proceed to describe the same with reference to the accompanying drawings, wherein—

Figure 1 is a view in top plan of an agricultural machine constructed in accordance with an embodiment of my invention; Fig. 2 is a longitudinal vertical sectional view taken through Fig. 1 at substantially its transverse center; Fig. 3 is a view in elevation of the rotary element herein embodied.

As disclosed in the accompanying drawings, F denotes a frame comprising the side members 1—1 and the forward connecting member 2, the rear or free end portions of the side members having operatively engaged therewith the supporting axle 3, to the opposite extremities of which are suitably affixed the traction wheels 4. At a point intermediate the side members 1—1, the axle 3 is surrounded by the sleeve 5 provided with the forwardly extending bearing 6 in which is loosely mounted an extremity of a shaft 7, the opposite end of said shaft being rotatably supported in a bearing 8 mounted for vertical movement within the guideway 9 suitably secured to the forward connecting member 2. The supporting axle 3 and the longitudinally disposed shaft 7 are operatively engaged, as at 10, through the medium of gears of a predetermined ratio. The intermediate portion of the shaft 7 is angular in cross section and has slidably engaged therewith the hub member 11 which is also adapted to rotate in unison with the shaft 7 and radiating from said hub member are the arms 12 terminating in the angular cutting members 14. The arms 12 are detachably engaged with the hub member 11 and it is to be observed that at predetermined points the arms are omitted for a purpose which is believed to be self-evident, and by varying the positions of the spaces afforded by the removal of the arms the distance between the plants to be left standing may be readily included in connection with the ratio of the gears comprised in the connection 10 between the supporting axle 3 and the shaft 7. Also projecting from the hub member 11 immediately in advance of each of the spaces afforded by the omission of an arm is an indicating arm 15 and serving as a medium whereby the operator may determine which plant is to be left standing.

Pivotally engaged with the bearing 8 is the upstanding link 16 also in pivotal engagement with the arm 17 carried by the rock shaft 18 provided with the operating lever 19 whereby it will be perceived that the shaft 7 may be raised or lowered as desired, and it is to be observed that the guide 9 serves as a cam member for imparting reciprocatory movement to the shaft 7 after being moved a predetermined distance whereby the gears comprised in the connection 10 may be disengaged or brought into mesh. As herein set forth, the bearing 8 is provided with the lateral projections 20 engaging the opposite faces of the guide 9 for effecting the desired endwise movement of the shaft 7 upon vertical movement being imparted thereto under the influence of the shaft 18. The lever 19 is provided with a conventional locking means 21 coacting with the rack 22 carried by the upper extremity of the guide-way 9.

During the operation of my improved machine, it may become necessary to adjust the hub 11 longitudinally of the shaft 7 or in the same general direction as the travel of the machine so that a plant will be weeded out which would otherwise be left standing and, as herein disclosed, the desired movement is imparted to the hub member through the medium of the yoke 23 operatively engaged, as at 24, with the hub 11 and pivotally secured, as at 25, to the crank member 26 supported for rocking movement by the forward connecting member 2 and provided with the upstanding lever 27 whereby the requisite axial rotation may be imparted to the crank member. The lever 27 is also provided with a conventional locking means 28 adapted to coact with the rack 29 carried by a side member 1.

Disposed transversely of the frame F and secured to the free extremities of the side members 1 is the yoke 30 having loosely engaged therewith the sleeve 31 provided with the rearwardly extending ears 32 with which are pivotally engaged the cultivator members 33 of any desired construction and adapted to be positioned at opposite sides of a row.

It is to be observed that the cultivator members 33 are movable about substantially vertical axes and said members adjacent their pivoted extremities are provided with the upstanding arms 34 pivotally engaged, as at 35, about substantially vertical axes, with the supplemental yoke 36 mounted for rocking movement upon the yoke 30, hereinbefore referred to.

In order to raise and lower the cultivator members 33 as desired, I have pivotally engaged with the supplemental yoke 36 a rigid link 37ᵃ also pivotally engaged with the crank 37 supported for rocking movement by the transverse member 38 connecting the side members 1—1 of the frame F at a predetermined point inwardly of the free or rearward extremities of said side members, and said crank 37 is provided with the operating lever 39 having conventional locking means 40 coacting with the rack 41, herein disclosed as supported by one of the side members 1.

The arms 34 are provided with the forwardly directed extensions 42 having their free extremities connected by the interposed link 44 pivotally engaged therewith and in pivotal engagement with said link 44 is the lever 45 disposed transversely of the frame F and in pivotal engagement with the bracket 46 supported for rocking movement by one of the arms 47 of a substantially horizontally movable bell lever 48.

The free extremity of the arm 47 has operatively engaged therewith the link 49 also operatively engaged with a bell lever 50 mounted for horizontal movement upon the bracket 51 supported by the transverse member 38 and the rocking movement of said bell lever 50 is limited in opposite directions by the upstanding stops 52 carried by the bracket 51 engageable with the laterally disposed arm 53 of the bell lever 50, said arm 53 also serving as an operating medium. It is thought to be obvious that upon proper adjustment of the bell lever 50, the lateral inclination of the cultivator members 33 may be adjusted as desired.

54 denotes a draft beam having its inner end portion substantially vertically disposed and rotatably supported by the forward connecting member 2 and with its major portion disposed on such a curvature as to substantially overlie the draft animals so that said draft pole will offer no obstruction to the animals especially when turning and the forward or free extremity of the pole 54 is adapted to be suitably connected to the neck yoke. The vertically disposed portion 55 of the draft pole is provided with a rock arm 56 operatively engaged with the bell lever 48 through the medium of the lever 57 whereby it will be perceived that lateral movement will be imparted to the draft pole in unison with the corresponding movement of the cultivator members 33. This adjustment is particularly desired in order to maintain the machine in line especially when working on a hillside.

From the foregoing description, it is thought to be obvious that an agricultural machine constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice.

I claim:

1. A machine of the character described comprising a rotatable member, cutting arms radiating therefrom, and indicating arms carried by the member in alinement with certain of the cutting arms.

2. A machine of the character described comprising a rotatable member, cutting arms radiating therefrom and arranged in series, and an indicating arm carried by the member and in alinement with an end arm of each series.

3. A machine of the character described comprising a rotatable member, cutting arms radiating therefrom, and indicating arms carried by the member in alinement with certain of the cutting arms, said arms terminating inwardly of the outer ends of the cutting arms.

In testimony whereof I hereunto affix my signature in the presence of two witnesses.

JOHN A. JOHNSON.

Witnesses:
J. D. HATFIELD,
E. R. FRENCH.

Copies of this patent may be obtained for five cents each, by addressing the "Commissioner of Patents, Washington, D. C."